(12) United States Patent
Esculier

(10) Patent No.: US 9,220,257 B2
(45) Date of Patent: Dec. 29, 2015

(54) RODENT BAITING STATION

(71) Applicant: DAKEM, Courbevoie (FR)

(72) Inventor: Marc Esculier, Neuilly sur Seine (FR)

(73) Assignee: DAKEM, Courbevoie (FR)

( * ) Notice: Subject to any disclaimer, the term of this patent is extended or adjusted under 35 U.S.C. 154(b) by 0 days.

(21) Appl. No.: 13/972,120

(22) Filed: Aug. 21, 2013

(65) Prior Publication Data

US 2013/0333273 A1 Dec. 19, 2013

Related U.S. Application Data

(63) Continuation of application No. PCT/IB2012/050775, filed on Feb. 21, 2012.

(30) Foreign Application Priority Data

Feb. 22, 2011 (FR) ..................................... 11 51441

(51) Int. Cl.
*A01M 23/02* (2006.01)
*A01M 23/16* (2006.01)
*A01M 25/00* (2006.01)
*A01M 23/00* (2006.01)

(52) U.S. Cl.
CPC ........... *A01M 25/004* (2013.01); *A01M 23/005* (2013.01); *A01M 23/02* (2013.01); *A01M 23/16* (2013.01)

(58) Field of Classification Search
CPC ............................... A01M 23/02; A01M 23/16
USPC ................................ 43/58, 64, 65, 71, 73, 74
See application file for complete search history.

(56) References Cited

U.S. PATENT DOCUMENTS

| 3,352,053 | A | | 11/1967 | Anderson | |
|---|---|---|---|---|---|
| 4,356,655 | A | * | 11/1982 | Morante et al. | 43/67 |
| 4,366,642 | A | * | 1/1983 | Gardner et al. | 43/82 |
| 5,305,545 | A | * | 4/1994 | Cerullo | 43/72 |
| 5,448,852 | A | * | 9/1995 | Spragins et al. | 43/131 |

(Continued)

FOREIGN PATENT DOCUMENTS

| EP | 0999742 B1 | 5/2002 |
|---|---|---|
| FR | 2849746 A1 | 7/2004 |

(Continued)

OTHER PUBLICATIONS

International Search Report for PCT/IB2012/050775 (filing date: Feb. 21, 2012) with a priority date of Feb. 22, 2011; Applicant: DAKEM.

(Continued)

*Primary Examiner* — David Parsley
(74) *Attorney, Agent, or Firm* — Andriy Lytvyn; Smith & Hopen, P.A.

(57) ABSTRACT

The invention is a baiting station for rodents. The baiting station comprises a housing, a lid, and a partition. The partition is transitional between two positions corresponding to two different modes of use of the baiting station. In the first position, the partition divides the internal space of the housing into a tunnel accessible by a rodent and an enclosed bait compartment that is inaccessible while the lid is closed. In the second position, the partition either lays flat with the bottom wall of the housing or is removed from the housing, thus allowing for placement of mechanical or glue traps within the housing.

11 Claims, 3 Drawing Sheets

(56) References Cited

U.S. PATENT DOCUMENTS

| | | | |
|---|---|---|---|
| 6,082,042 A * | 7/2000 | Issitt | 43/131 |
| 6,389,738 B1 | 5/2002 | Denny et al. | |
| 2008/0072475 A1* | 3/2008 | Nelson et al. | 43/131 |
| 2009/0229169 A1* | 9/2009 | Weisberg et al. | 43/65 |
| 2009/0307963 A1 | 12/2009 | Abbas | |

FOREIGN PATENT DOCUMENTS

| | | |
|---|---|---|
| WO | 9406286 A1 | 3/1994 |
| WO | 9810645 A1 | 3/1998 |
| WO | 9963812 A1 | 12/1999 |
| WO | 2004098281 A1 | 11/2004 |
| WO | 2005006857 A2 | 1/2005 |
| WO | 2009157027 A1 | 12/2009 |

OTHER PUBLICATIONS

Translation of International Search Report of PCT/IB2012/050775 (filing date Feb. 21, 2012) with a priority date of Feb. 22, 2011; Applicant: DAKEM.

French Search Report for FR 1151441.

* cited by examiner

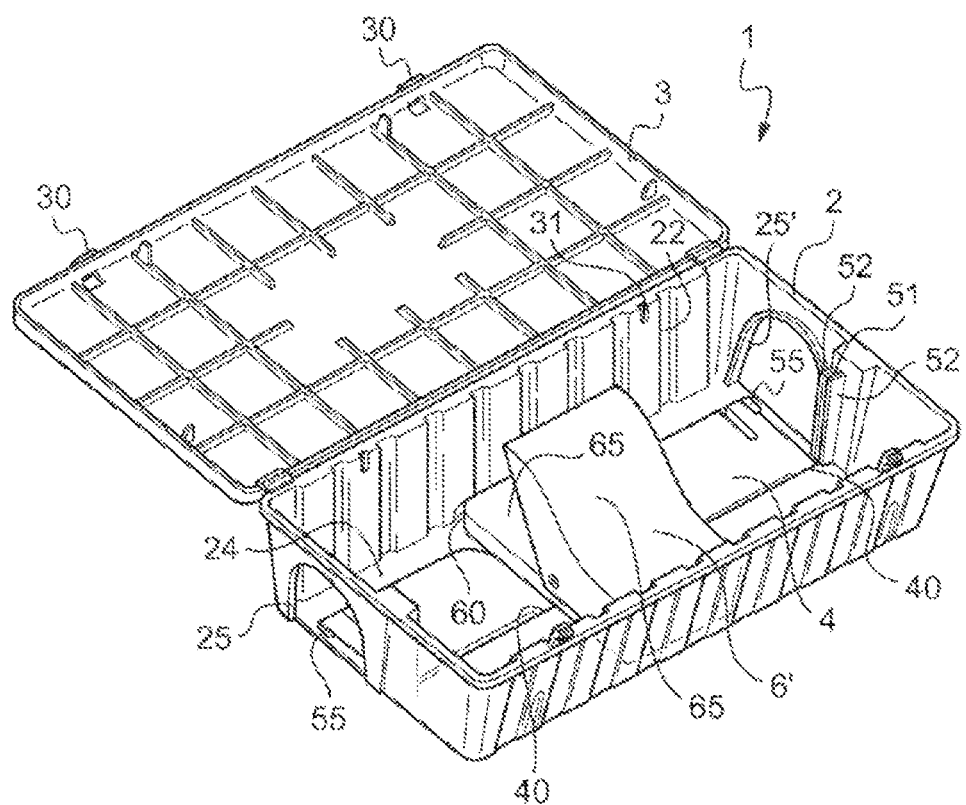

RODENT BAITING STATION

CROSS REFERENCE TO RELATED APPLICATIONS

This application is a continuation of PCT Patent Application No. PCT/IB2012/050775, titled "RODENT BAITING STATION," filed Feb. 21, 2012, which claims priority to French Patent Application No. 11/51,441 with the same title and a filing date of Feb. 22, 2011, which is herein incorporated by reference.

BACKGROUND OF THE INVENTION

1. Field Of The Invention

The present invention relates to the field of pest control. More particularly, the invention relates to the capturing and removal of rodents.

2. Brief Description Of The Related Art

A first common solution for removing rodents is to use poisoned bait. In this type of use, it is simultaneously necessary to lure the rodents, make it easy for them to access the bait and guarantee the safety of the premises that have been treated, in particular by preventing children and pets from accessing the poison.

The documents FR 2 849 746 and U.S. 2009/0307963 disclose pins or rods for holding the bait inside a baiting station. These rods mean that the stations are complex to manufacture and can prove fragile in terms of maintenance.

The document WO 2009/157027 discloses a single-use safety baiting station containing a predetermined quantity of poisoned bait. However, these single-use traps create a large amount of waste which is potentially dangerous and/or polluting, especially because of the residues of poisoned bait which cannot always be removed via the usual waste disposal channels.

Baiting stations for rodents generally take the form of boxes equipped with a lid which are closed by a safety lock, having an access opening for the rodents and a separate inner part for holding the bait. The documents WO 2005/006857 and EP 0 999 742 describe, for example, baiting stations having internal partitions which separate the poisoned bait from the entrance to the trap. The application WO 94/06286 and patent U.S. Pat. No. 3,352,053 describe collapsible baiting stations. Patent U.S. Pat. No. 6,389,738 teaches a trap for pests having a base and a lid capable of assuming two configurations depending on whether the trap is used for rodents or insects.

For many years, invasive populations of rodents have been controlled by positioning traps which can capture rodents at the points where they pass by. The documents WO 98/10645, WO 99/63812 and WO 2004/098281 disclose rodent removal devices which can be equipped with a removable receptacle intended to hold some poisoned bait or with a trap for capturing the animal. There is still a need to improve the existing devices for removing harmful rodents.

SUMMARY OF THE INVENTION

The object of the present invention is thus to provide a baiting station which is easy to manufacture and manipulate whilst at the same time being effective and safe.

The subject of the invention is a baiting station for rodents, comprising a box, in particular made from plastic, defining an internal space and comprising an internal partition and at least one opening. The invention further includes a lid and a safety lock system. The invention is characterized in that the internal partition may move between a first and a second positions and separates the internal space into two parts when it is in the first position.

The first and second positions may thus correspond to different modes of use of said baiting station for rodents.

In its first position, the movable partition creates the partitioning required for placing bait whilst preventing this bait from moving around or being touched by children's hands. The baiting station is thus made safe.

In its first position, the partition is, for example, vertical.

The partition may pivot about a hinge and/or be removable.

The baiting station may comprise a clip-fastening system designed to hold the partition in its first position. Alternatively, the partition may be fixed in the first position using any suitable means. In an alternative embodiment, the partition is removable and may slide partially in guides situated inside the box so that it can be held in its first position.

The partition may be cut out from the base and form the base of the box in the second position.

When the partition is in its second position, folded down onto the base, the station allows the positioning of a trap which may in particular be designed to hold the rodent captive, whilst preserving the external volumes of the station, which is essential to allow it to be positioned in the different configurations of the premises being treated.

The trap is, for example, a glue trap or a mechanical trap that in particular comprises jaws that are closed around the rodent, in particular over its head. A choice can thus be made between two alternative uses: the present invention enables glue traps to be placed in the baiting stations and also allows the internal partitioning of the station to be used to place bait, as described above.

The baiting station may also comprise a trap designed to hold the rodent captive, in particular a glue trap or a mechanical trap which may be positioned on the said partition in its second position.

The baiting station preferably comprises at least two openings defining the ends of a tunnel that extends over the length of the box, which facilitates entry and causes the rodent less anxiety than a single opening.

The baiting station may be stacked in particular with other stations of the same type when the partition is in the second position. This option of stacking the stations makes it much easier for operatives to transport and deploy them on sites.

The baiting station may also comprise means for fastening to a support, in particular holes for fastening elements to pass through.

The opening or one of the openings is preferably adjacent to a box side which comprises external shoulders designed to hold the box, erected on the said side, in a stable position. Such a station may be used in two different positions: horizontally on the base of the box or vertically erected on one side, which makes it easier to place it in confined spaces.

DESCRIPTION OF THE DRAWINGS

The invention may be better understood on reading the detailed description which follows of an exemplary embodiment of the invention and on examining the appended drawing in which:

FIG. 5 is a perspective view the third embodiment of the invention.

DETAILED DESCRIPTION OF THE INVENTION

Figure 1:
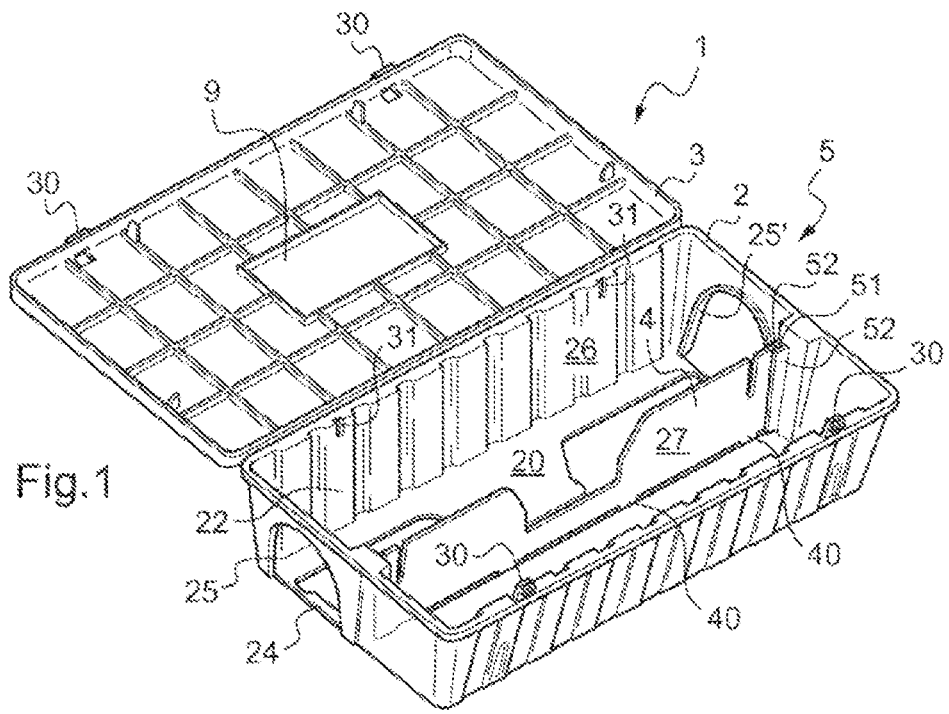
FIG. 1 is a perspective view of a first embodiment of the invention in a first position.

The baiting station 1 for rodents illustrated in FIG. 1 comprises the form of a plastic box 2 equipped with a lid 3 which closes by a safety lock 30. In the example illustrated, the safety lock system 30 consists of tongues with studs that may be inserted into corresponding housings. Any safety closure means known to a person skilled in the art, for example comprising keys, clips or staples may be used.

In the example illustrated, the lid is held together with the box by a hinge 31. A lid which is totally removable and can be closed securely would not go beyond the scope of the invention.

The station 1 is shown open. The partition 4, cut out from the base 24 of the box, is held in a vertical position by a clip-fastening system (5) comprising fastening tabs 55 that are slid into two grooves 51, each of which is situated between two mounting posts 52 which may be attached to the box 2 as illustrated, or be molded with the box.

The partition separates the internal space 20 of the box 2 into a tunnel 26 and a space 27 into which some rodent bait may be put, whilst ensuring that it cannot be accessed by a person or an animal situated outside the box once the lid 3 is closed and locked.

Any other fastening means known to a person skilled in the art could be used which allows the partition 4 to be held in a vertical position.

The baiting station 1 illustrated also comprises a labeling area 9 which may in particular be used by the manufacturer to apply technical or commercial data or safety information. This area may also be used by the end user, for example to indicate the last date on which the bait was replaced, or by a health inspection body.

Once the partition 4 comprises been folded down into the cutout in the base 24 in its second position, the station 1 may be stacked with similar stations.

In an alternative embodiment which is not illustrated, injection-molded tongues form the hinge 31 of the lid and the hinge 40 of the partition. The mounting posts for fastening the partition in its second partition may also be molded with the remainder of the station. Such an embodiment is particularly easy and economical to manufacture in a single molding operation, in particular by injecting a thermoplastic material. It is also convenient to package, for example in the form of groups of multiple stacked stations, to transport and to install.

Figure 2:
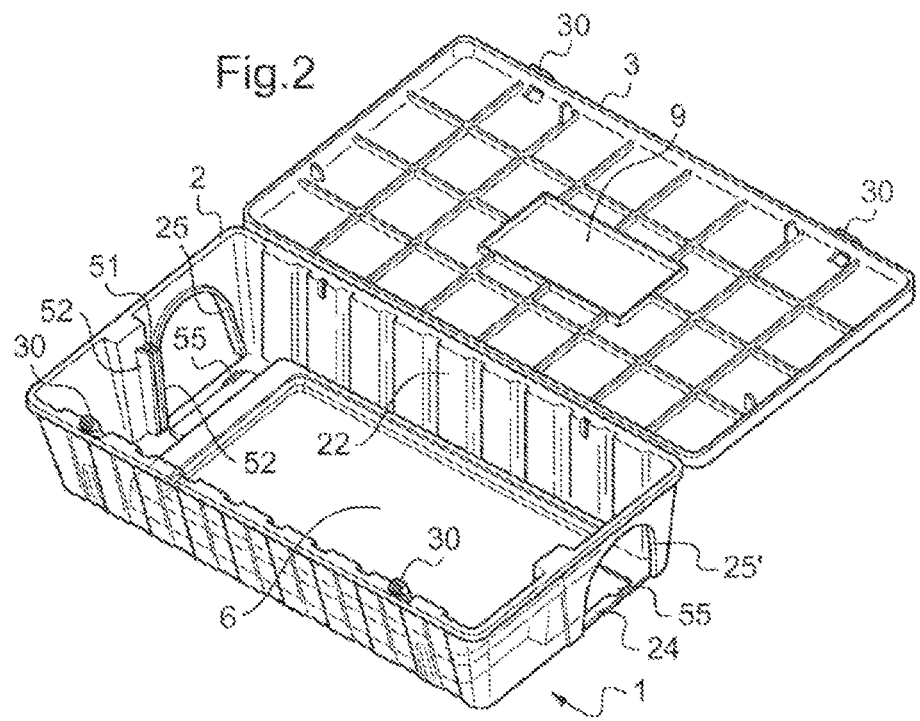
FIG. 2 is a perspective view of the first embodiment of the invention in a second position.

Another mode of use of the baiting station of FIG. 1 is shown in FIG. 2. The partition 4 is here in its second position, folded down onto base 24 of the box 2, on which base a glue trap 6 has been placed.

The baiting stations may comprise a glue trap or such glue traps may be sold and delivered separately, in particular in groups.

Figure 3:
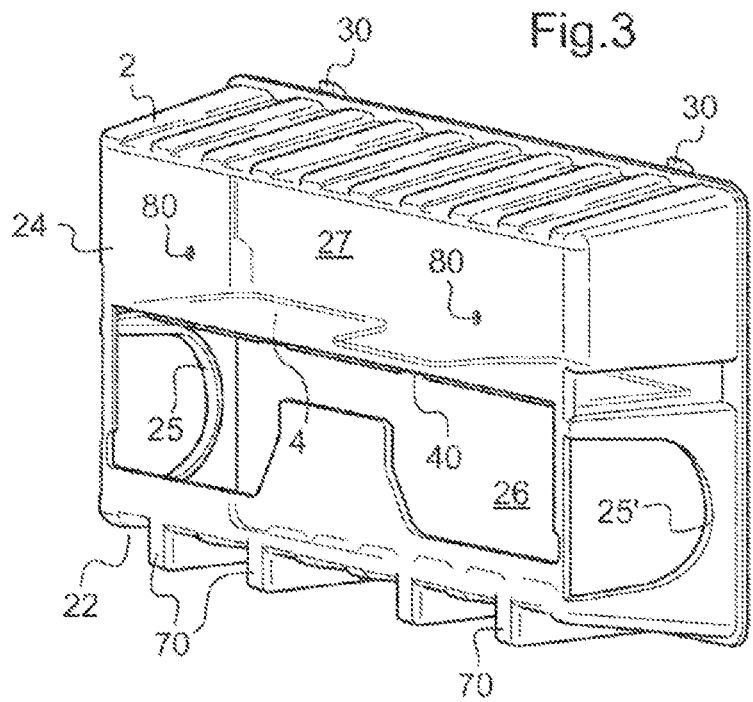
FIG. 3 is a perspective view of a second embodiment of the baiting station according to the invention.

Only the box 2 of a baiting station 1 is shown in FIG. 3. The access tunnel 26, situated between the openings 25 and 25' is defined, on the one hand, by the movable partition 4 and, on the other hand, by a side 22 of the box 2 which comprises external shoulders 70 in this embodiment. The box 22 stands on the side 22 and held vertically by the shoulders 70. The presence of the shoulders therefore makes it possible to choose between the vertical position illustrated and a horizontal position on the base 24, similar to that shown in FIGS. 1 and 2. These two options may be particularly advantageous, depending on the location where the station is going to be put, in particular for placing the traps in the rodents' favorite locations which may be particularly confined, for example behind machines or inside service ducts that are more narrow than they are tall.

Figure 4:
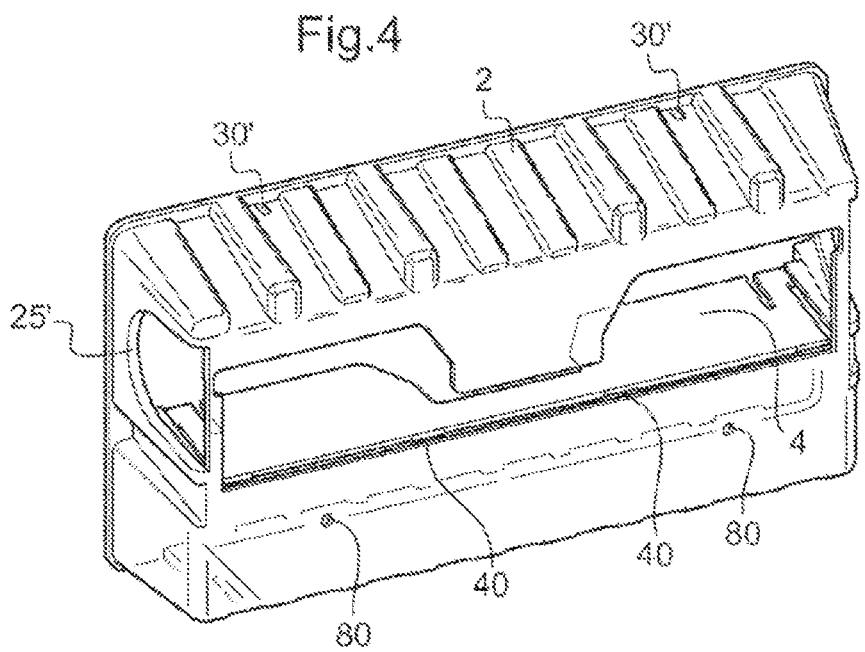
FIG. 4 is a perspective view illustrating the bottom surface of the baiting station according to the second embodiment of the invention.

It may be necessary to make the position of the baiting station safe in order to prevent, for example, a child from removing the trap or a rodent held captive inside from moving the station by making erratic movements. The station of which the box is illustrated in FIG. 4 comprises fastening holes 80. These fastening means 8 are arranged so as to enable the baiting station to be fastened to a support, for example the floor or a wall, without obstructing the opening or closing of the lid 3 and thus making it possible, without moving the station, to replace the bait or alternatively switch the use mode from "poisoned bait" mode to "glue trap" mode or to "mechanical trap" mode.

In this example, the safety lock system 30' comprises cable passages and, once the box comprises been closed, the lid is held in place using collars, for example single-use collars, placed inside these cable passages.

The alternative embodiment of the baiting station 1, illustrated in the open position in FIG. 5 in its second position with the wall 4 folded down into the cutout of the base 24, also comprises a mechanical trap 6' equipped with two jaws 65 which are configured to close about the rodent's head.

Such traps are well known to a person skilled in the art. The baiting station may moreover be used with commercially available mechanical traps and does not require specially adapted traps.

When it is desired to use traps such as glue traps or mechanical traps to eliminate the rodents, the station according to the invention offers a solution and is more hygienic than an uncovered trap and also makes it easier to remove trapped rodents.

The exemplary embodiment illustrated also optionally comprises a recess 60 in the lower part of the wall 22 which makes it easier to position and hold the trap 6' in place. The station according to the invention may thus comprise one or more recesses, for example, in the lower part of opposite walls of the box 2.

The stations illustrated are made by injection-molding thermoplastic material. Using a station with a different form of manufacture would not be going beyond the scope of the present invention.

In their second position, the stations illustrated are used with a glue trap or a mechanical trap equipped with jaws but it would not be going beyond the scope of the present invention to use a station comprising a different type of trap.

What is claimed is:

1. A baiting station for rodents, comprising:
    a housing having two longitudinal walls, two lateral walls, and a bottom wall, the walls collectively defining an internal space;
    at least one entry opening disposed on a lateral or a longitudinal wall, the entry opening configured to allow a rodent to pass therethrough;
    a partition disposed within the housing, the partition being transitional between a first and a second positions within the housing, the partition configured to divide the internal space of the housing into first and second compartments when the partition is in the first position, wherein the partition is cut out from the bottom wall of the housing and forms the bottom wall of the housing in the second position;

a lid adapted to selectively enclose the internal space of the housing; and a lock system configured to retain the lid in a closed position;

wherein the first and the second positions of the partition correspond to two different modes of use of the baiting station, the first position corresponding to a poisoned bait mode in which the first compartment is configured to retain a poisoned bait preventing direct access thereto from outside the housing while permitting access thereto from the second compartment, the second position corresponding to a trap mode in which the internal space of the housing is configured to retain a rodent trap.

2. The baiting station as claimed in claim 1, wherein the housing has at least two entry openings, the entry openings defining ends of a longitudinal tunnel within the housing.

3. The baiting station as claimed in claim 1, wherein the bottom wall has an extrusion, the extrusion adapted to receive the partition when the partition is in the second position.

4. The baiting station as claimed in claim 1, further comprising a clip-fastening system disposed within the housing, the clip-fastening system configured to retain the partition in the first position.

5. The baiting station as claimed in claim 1, wherein the partition pivots about a hinge.

6. The baiting station as claimed in claim 1, wherein the partition is removable.

7. The baiting station as claimed in claim 1, wherein two or more baiting stations are stackable when the partitions are in the second position.

8. The baiting station as claimed in claim 1, further comprising a plurality of external ribs disposed on the longitudinal wall, the external ribs configured to support the housing in a vertical position with the longitudinal wall functioning as a base.

9. The baiting station as claimed in claim 1, further comprising a plurality of fastening holes disposed on the bottom wall of the housing, the fastening holes configured to permit fastening of the housing to a support.

10. The baiting station as claimed in claim 1, further comprising a trap disposed within the internal space of the housing, the trap configured to retain a rodent.

11. The baiting station as claimed in claim 1, wherein the trap is a glue trap or a mechanical trap placed on the partition when the partition is in the second position.

* * * * *